US008937735B2

(12) United States Patent
Mori

(10) Patent No.: US 8,937,735 B2
(45) Date of Patent: Jan. 20, 2015

(54) NON-TRANSITORY STORAGE MEDIUM STORING IMAGE-FORMING-DATA TRANSMITTING PROGRAM, MOBILE TERMINAL, AND CONTROL METHOD THEREFOR TRANSMITTING MOVEMENT AND ORIENTATION INFORMATION OF MOBILE TERMINAL

(75) Inventor: Hiromi Mori, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 123 days.

(21) Appl. No.: 13/361,889

(22) Filed: Jan. 30, 2012

(65) Prior Publication Data
US 2012/0250082 A1 Oct. 4, 2012

(30) Foreign Application Priority Data
Mar. 31, 2011 (JP) .................... 2011-080170

(51) Int. Cl.
G06F 3/12 (2006.01)

(52) U.S. Cl.
CPC ............ *G06F 3/1204* (2013.01); *G06F 3/1253* (2013.01); *G06F 3/1292* (2013.01); *G06F 3/1252* (2013.01); *G06F 2200/1637* (2013.01)
USPC .......................................... 358/1.15; 358/1.1

(58) Field of Classification Search
USPC ................................. 358/1.15, 1.1
See application file for complete search history.

(56) References Cited

U.S. PATENT DOCUMENTS

| 5,428,459 A | 6/1995 | Asai |
|---|---|---|
| 8,294,927 B2 | 10/2012 | Kunori |
| 2003/0093757 A1 | 5/2003 | Silverbrook et al. |
| 2004/0157647 A1 | 8/2004 | Takahashi |

(Continued)

FOREIGN PATENT DOCUMENTS

| CN | 1722764 A | 1/2006 |
|---|---|---|
| CN | 101855837 A | 10/2010 |

(Continued)

OTHER PUBLICATIONS

Japanese Office Action mailed on Jul. 10, 2012 from JP 2010-177339 and English translation.

(Continued)

*Primary Examiner* — Martin Mushambo
(74) *Attorney, Agent, or Firm* — Scully, Scott, Murphy & Presser, P.C.

(57) ABSTRACT

A nonvolatile storage medium storing an image-forming-data transmitting program readable by a computer of a mobile terminal including: a sensor for outputting sensor information indicating at least one of a movement and an orientation of the mobile terminal; a communication portion for communicating with an image forming apparatus for forming image based on image forming data; and a display for displaying an image based on image data. The image-forming-data transmitting program has the computer function as: a parameter determining section for determining a parameter for image forming based on the sensor information; an image-forming-data-creation controlling section for controlling a first creating section to create image forming data based on the image data, by using the determined parameter; and an image-forming-data-transmission controlling section for controlling the communication portion to transmit the created image forming data to the image forming apparatus.

10 Claims, 12 Drawing Sheets

(56) References Cited

U.S. PATENT DOCUMENTS

| | | | |
|---|---|---|---|
| 2004/0252318 A1* | 12/2004 | Kuroda et al. | 358/1.12 |
| 2005/0143124 A1 | 6/2005 | Kennedy et al. | |
| 2006/0012832 A1* | 1/2006 | Kayanuma | 358/296 |
| 2007/0085157 A1 | 4/2007 | Fadell et al. | |
| 2007/0086051 A1 | 4/2007 | Kunori | |
| 2009/0117951 A1 | 5/2009 | Alameh et al. | |
| 2010/0066763 A1 | 3/2010 | MacDougall et al. | |
| 2010/0323671 A1 | 12/2010 | Jeong | |
| 2011/0222087 A1 | 9/2011 | Gelphman | |
| 2012/0033262 A1 | 2/2012 | Sakurai | |
| 2012/0250082 A1 | 10/2012 | Mori | |

FOREIGN PATENT DOCUMENTS

| | | |
|---|---|---|
| CN | 101931688 A | 12/2010 |
| EP | 1 469 668 A2 | 10/2004 |
| JP | 2001-156893 A | 6/2001 |
| JP | 2001-169082 A | 6/2001 |
| JP | 2002-090866 A | 3/2002 |
| JP | 2004-30280 A | 1/2004 |
| JP | 2004-164102 A | 6/2004 |
| JP | 2004-240878 A | 8/2004 |
| JP | 2005-055513 A | 3/2005 |
| JP | 2006-027017 A | 2/2006 |
| JP | 2006-302165 A | 2/2006 |
| JP | 2007-141215 A | 6/2007 |
| JP | 2007-517462 A | 6/2007 |
| JP | 2007-251750 A | 9/2007 |
| JP | 2007-276317 A | 10/2007 |
| JP | 2008-142969 A | 6/2008 |
| JP | 2008-168580 A | 7/2008 |
| JP | 2008-158975 A | 10/2008 |
| JP | 2008-250823 A | 10/2008 |
| JP | 2009-061606 A | 3/2009 |
| JP | 2010109741 A | 5/2010 |
| WO | 2005/069593 A1 | 7/2005 |

OTHER PUBLICATIONS

Japanese Office Action mailed on Jan. 29, 2013 from JP 2010-177339 and English translation.
Japanese Office Action mailed on May 28, 2013 from JP 2010-177339 and English translation.
European Extended Search Report dated Jun. 17, 2013 from EP 11176471.8.
U.S. Office Action dated Oct. 3, 2013, from related U.S. Appl. No. 13/205,169.
Yoshikawa, "Complete Comparison of the "hot stuff" iPhone and Xperia: Work 10 times more efficient by using smartphones" Nikkei PC 21, Nikkei Business Publications, Inc., May 24, 2010, vol. 15, No. 11, pp. 81-91 together with partial translation.
Japanese Office Action dated Feb. 18, 2014 from related Japanese Application No. 2013-073009, together with an English language translation.
U.S. Office Action dated Mar. 18, 2014 from related case, namely, U.S. Appl. No. 13/205,169.
Chinese Official Action dated Jun. 25, 2014 received in related application CN 201210021397.3.
United States Official Action dated Aug. 29, 2014 received in related U.S. Appl. No. 13/205,169.

* cited by examiner

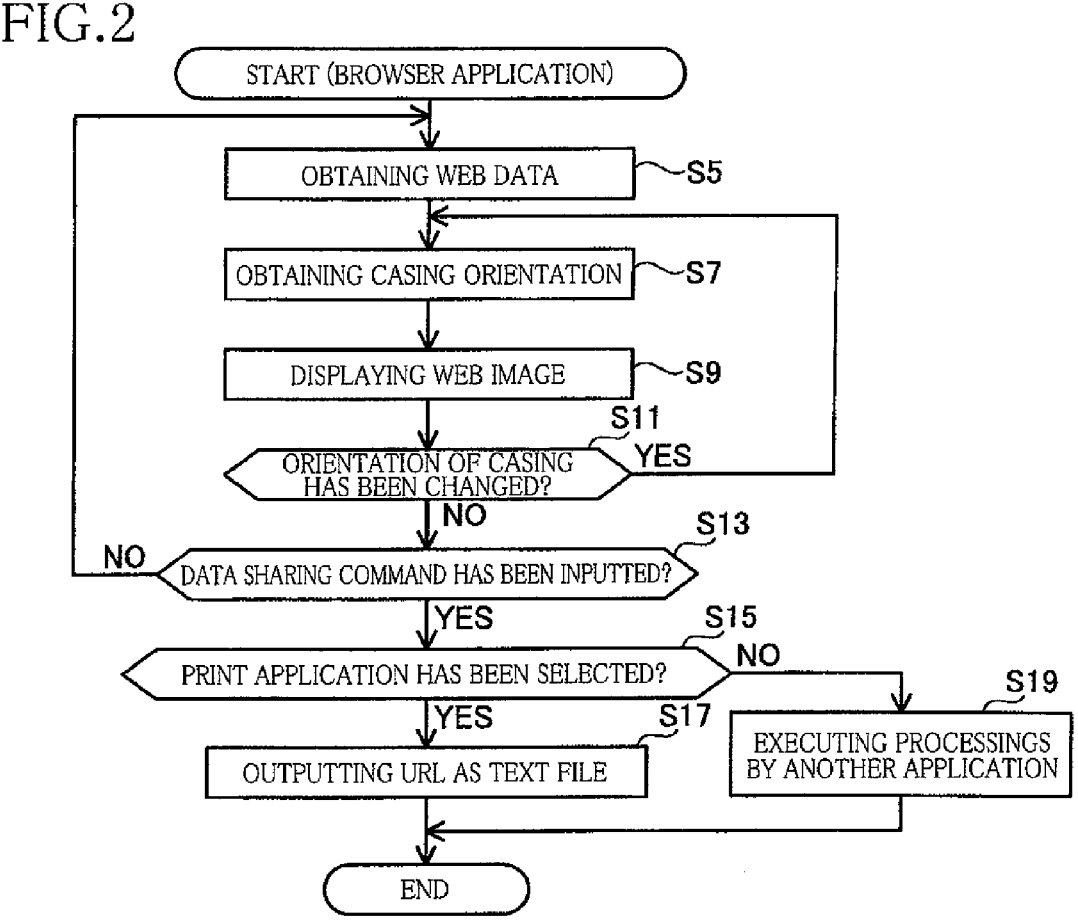
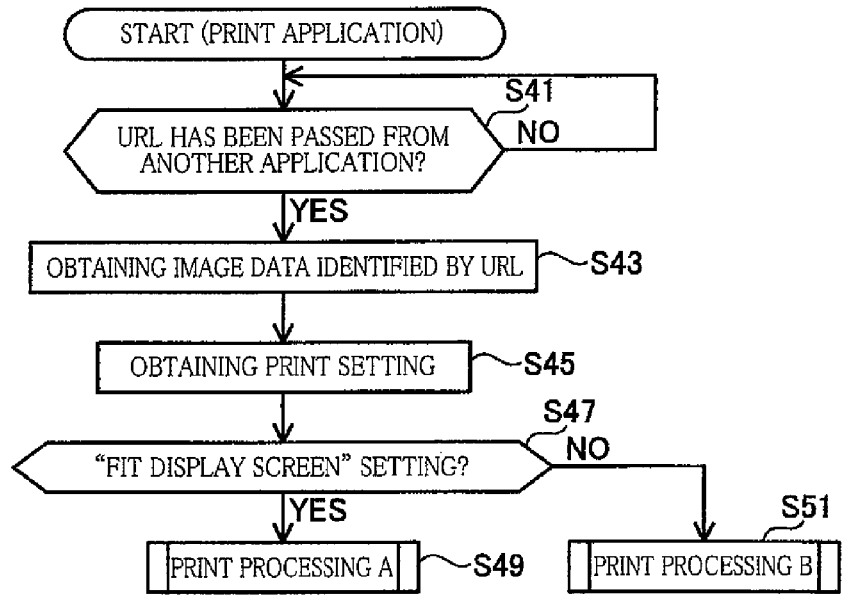

FIG.18

NON-TRANSITORY STORAGE MEDIUM STORING IMAGE-FORMING-DATA TRANSMITTING PROGRAM, MOBILE TERMINAL, AND CONTROL METHOD THEREFOR TRANSMITTING MOVEMENT AND ORIENTATION INFORMATION OF MOBILE TERMINAL

CROSS REFERENCE TO RELATED APPLICATION

The present application claims priority from Japanese Patent Application No. 2011-080170, which was filed on Mar. 31, 2011, the disclosure of which is herein incorporated by reference in its entirety.

BACKGROUND OF THE INVENTION

1. Field of the Invention

The present invention relates to a nonvolatile storage medium storing an image-forming-data transmitting program, a mobile terminal, and a control method therefor, which enable a user to easily set a print setting and the like.

2. Description of the Related Art

There is known a technique for controlling a display on a liquid crystal monitor such that upper and lower sides of an image to be displayed on the liquid crystal monitor coincide with those in a direction of gravity, on the basis of orientation information of the image and orientation information of a phone main body which have been attached to image data upon producing the image. As a result, a screen on the liquid crystal monitor is rotated automatically depending upon an operation state and an orientation of the mobile phone device. This makes it possible for a user to view an image without changing the orientation of the phone main body depending upon an orientation of the image.

SUMMARY OF THE INVENTION

However, there has not been proposed a method for performing a print setting (e.g., for setting vertical and horizontal direction (orientation) of a print image with respect to those of a recording sheet). Thus, there may be a need for providing a print-orientation-setting change button and/or a print-orientation setting screen to perform the print setting, for example. In this case, it is difficult for the user to intuitively perform the print setting. This invention has been developed in view of the above-described situations, and it is an object of the present invention to provide a nonvolatile storage medium storing an image-forming-data transmitting program, a mobile terminal, and a control method therefore, which can eliminate the above-described inconvenience.

The object indicated above may be achieved according to the present invention which provides a nonvolatile storage medium storing an image-forming-data transmitting program readable by a computer of a mobile terminal, the mobile terminal comprising: a sensor configured to output sensor information indicating at least one of a movement and an orientation of the mobile terminal; a communication portion configured to communicate with an image forming apparatus that is configured to form an image based on image forming data; a data storage portion storing image data; and a display configured to display thereon an image on the basis of the image data, the image-forming-data transmitting program being designed to have the computer function as: a parameter determining section configured to determine a parameter for image forming on the basis of the sensor information outputted by the sensor; an image-forming-data-creation controlling section configured to control a first creating section to create image forming data based on the image data stored in the data storage portion, by using the parameter determined by the parameter determining section; and an image-forming-data-transmission controlling section configured to control the communication portion to transmit, to the image forming apparatus, the image forming data created by the first creating section.

The object indicated above may also be achieved according to the present invention which provides a control method for a mobile terminal, the mobile terminal comprising: a sensor configured to output sensor information indicating at least one of a movement and an orientation of the mobile terminal; a communication portion configured to communicate with an image forming apparatus that is configured to form an image based on image forming data; and a data storage portion storing image data, the control method comprising a parameter determining step for determining a parameter for image forming on the basis of the sensor information outputted by the sensor; an image-forming-data-creation controlling step for controlling a first creating section to create image forming data based on the image data stored in the data storage portion, by using the parameter determined in the parameter determining step; and an image-forming-data-transmission controlling step for controlling the communication portion to transmit, to the image forming apparatus, the image forming data created by the first creating section.

The object indicated above may be also achieved according to the present invention which provides a mobile terminal comprising: a sensor configured to output sensor information indicating at least one of a movement and an orientation of the mobile terminal; a communication portion configured to communicate with an image forming apparatus that is configured to form an image based on image forming data; a data storage portion storing image data; a display configured to display thereon an image on the basis of the image data; a parameter determining section configured to determine a parameter for image forming on the basis of the sensor information outputted by the sensor; an image-forming-data-creation controlling section configured to control a first creating section to create image forming data based on the image data stored in the data storage portion, by using the parameter determined by the parameter determining section; and an image-forming-data-transmission controlling section configured to control the communication portion to transmit, to the image forming apparatus, the image forming data created by the first creating section.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 2 is a flow-chart showing an operation of a mobile phone;

FIG. 3 is a flow-chart showing the operation of the mobile phone;

FIG. 18 is a table showing a user-I/F-data create processing;

DETAILED DESCRIPTION OF THE EMBODIMENT

Figure 1:
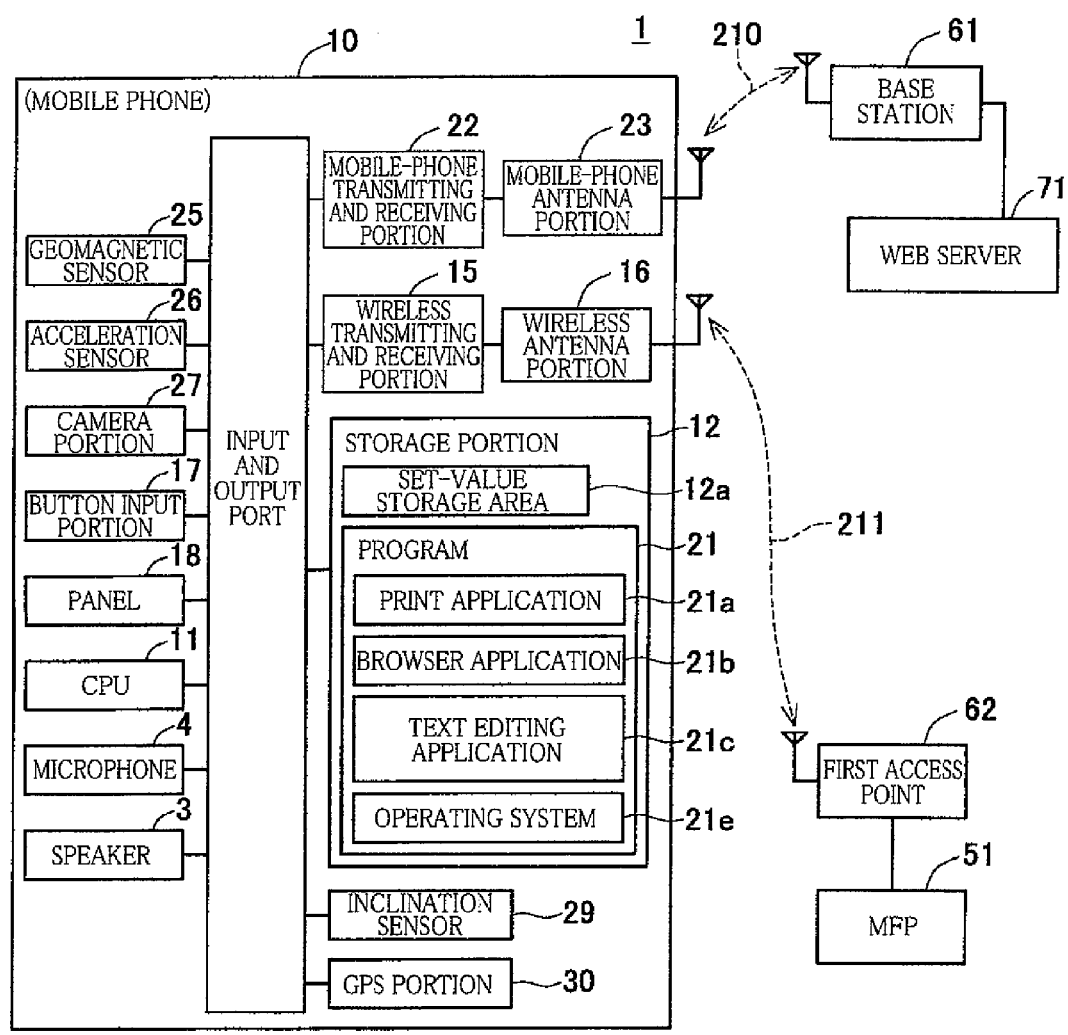
FIG. 1 is a block diagram of a communication system 1.

A communication system 1 as one embodiment to which present invention is applied includes a mobile phone 10 as one example of a mobile (portable) terminal or a mobile device, a multi-function peripheral (MFP) 51 as one example of an image forming apparatus, a first access point 62, a web server 71, and a base station 61. Each of the mobile phone 10 and the MFP 51 has a function as a well-known wireless LAN device. The MFP 51 has various functions such as a printing function, a scanning function, a copying function, and a facsimile function. The first access point 62 functions as a well-known wireless-LAN access point. The web server 71 is configured to provide various functions and data stored therein for a client device in a network.

It is noted that the mobile phone 10 and the first access point 62 can perform wireless communication (data communication using radio waves) 211 by using a wireless LAN operating in an infrastructure mode (that is a mode in which a plurality of wireless LAN devices (terminals) perform data communication via access points). That is, when the mobile phone 10 accesses the first access point 62, and the wireless communication 211 using the infrastructure mode of the wireless LAN is allowed, the mobile phone 10 can perform data communication with the MFP 51 via the first access point 62. It is noted that the wireless LAN communication can use IEEE802.11a/b/g/n standards, for example.

There will be explained a construction of the mobile phone 10. As shown in FIG. 1, the mobile phone 10 includes a central processing unit (CPU) 11 as one example of a computer, a storage portion 12 as one example of a data storage portion, a wireless transmitting and receiving portion 15 as one example of a communication portion, a wireless antenna portion 16, a button input portion 17 as one example of an operation portion, a panel 18 as one example of a display, a mobile-phone transmitting and receiving portion 22, a mobile-phone antenna portion 23, a geomagnetic sensor 25, an acceleration sensor 26, a camera portion 27, an inclination sensor (called a gyroscope) 29, and a global positioning system (GPS) portion 30. Further, the mobile phone 10 includes a speaker 3 and a microphone 4 for a phone conversation and a voice input. The geomagnetic sensor 25, the acceleration sensor 26, the inclination sensor 29, and the GPS portion 30 are examples of a motion sensor for outputting sensor information.

The CPU 11 executes processings according to programs 21 stored in the storage portion 12. Hereinafter, the CPU 11 that executes programs such as a print application 21a and an operating system 21e may be simply referred to as a name of the program. For example, words "the print application 21a executes" may mean "the CPU 11 that executes the print application 21a executes". It is noted that the storage portion 12 is constituted by various components such as a random access memory (RAM), a read only memory (ROM), a flash memory, a hard disc (HDD), and a buffer of the CPU 11. The wireless transmitting and receiving portion 15 performs the wireless communication 211 using the infrastructure mode of the wireless LAN via the wireless antenna portion 16. The mobile-phone transmitting and receiving portion 22 performs wireless communication 210 with the base station 61 via the mobile-phone antenna portion 23 (the wireless communication 210 uses a communication method of the mobile phone). The wireless transmitting and receiving portion 15, the mobile-phone transmitting and receiving portion 22, and the like transmit and receive digital signals constituting various data.

The storage portion 12 stores the programs 21. The programs 21 include the print application 21a, a browser application 21b, a text editing application 21c, and the operating system 21e.

The print application 21a is an application for making the CPU 11 execute, e.g., a print processing for transmitting print data from the mobile phone 10 to the MFP 51. The CPU 11 can execute a processing according to the browser application 21b to obtain web data from the web server 71, to store the web data into the storage portion 12, and to display, on the panel 18, an image based on the web data in the storage portion 12. The text editing application 21c is an application for making the CPU 11 execute processings for creating, editing, and saving a document file.

The operating system 21e is a program for providing basic functions commonly used by the print application 21a and the browser application 21b. The operating system 21e includes: a program for making the mobile-phone transmitting and receiving portion 22 perform the communication; and a program for making the wireless transmitting and receiving portion 15 perform the wireless communication 211. The operating system 21e is also a program for providing an application programming interface (the API) for making each program command hardware or obtain the information calculated by the geomagnetic sensor 25, the acceleration sensor 26, the inclination sensor 29, the GPS portion 30, and the like.

The storage portion 12 includes a set-value storage area 12a. The set-value storage area 12a stores information such as terminal information 100 and a print setting 110 which will be described below.

Figure 20:
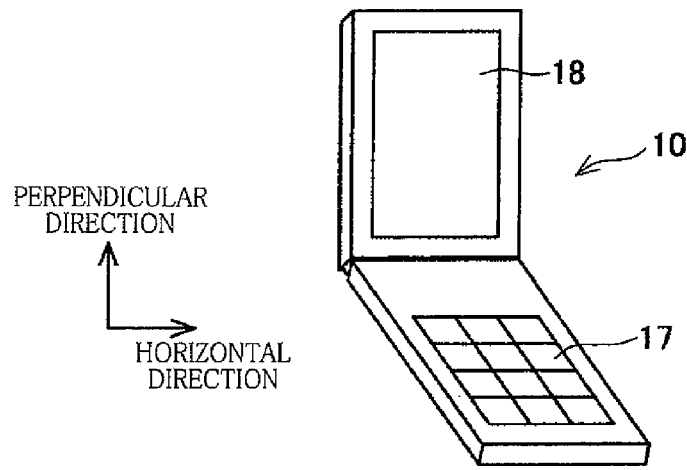
FIG. 20 is a view representing a type of the mobile phone.
Figure 21:
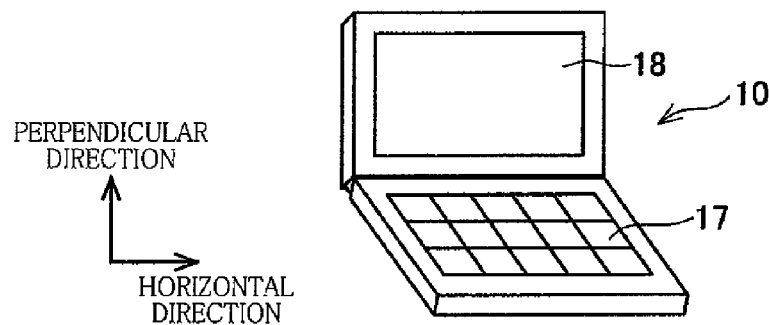
FIG. 21 is a view representing a type of the mobile phone.

The terminal information 100 includes model information 101, a vertical and horizontal setting 102, casing orientation information 103. The model information 101 is information about models of the mobile phone such as a vertical model, a horizontal model, a vertical and horizontal model. As shown in FIG. 20, the vertical model is a model in which a user can properly operate the button input portion 17 where the user holds the mobile phone such that a short side of the rectangular panel 18 extends in a horizontal direction, and a long side thereof extends in a perpendicular direction that is perpendicular to the horizontal direction (hereinafter, this way of holding the mobile phone may be referred to as "vertical holding"). As shown in FIG. 21, the horizontal model is a model in which the user can properly operate the button input portion 17 where the user holds the mobile phone such that the long side of the rectangular panel 18 extends in the horizontal direction, and the short side thereof extends in the perpendicular direction (hereinafter, this way of holding the mobile phone may be referred to as "horizontal holding").

Figure 22:
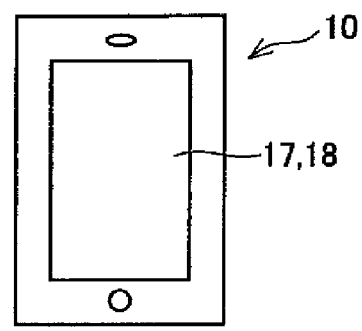
FIG. 22 is a view representing a type of the mobile phone.

As shown in FIG. 22, the vertical and horizontal model is a model in which the user can operate the mobile phone 10 properly in either of the vertical holding and the horizontal holding. The vertical and horizontal setting 102 is active or operative where the model information 101 is the vertical and horizontal model. The vertical and horizontal setting 102 is information for the user to fix the way the user holds the mobile phone 10 to the vertical holding or the horizontal holding in the vertical and horizontal model.

The casing orientation information 103 is information about an orientation of a casing of the mobile phone 10. The casing orientation information 103 includes a normal vertical (portrait) orientation, a flipped vertical (portrail) orientation, a left horizontal (landscape) orientation, and a right horizontal (landscape) orientation. The casing orientation information 103 is set using the rectangular panel 18 as a reference. Specifically, the normal vertical orientation is an orientation of the casing in which the short side of the panel 18 extends in the horizontal direction, and the long side thereof extends in the perpendicular direction. The flipped vertical orientation is an orientation of the casing in which the casing in the normal vertical orientation is rotated 180 degrees. The left horizontal orientation is an orientation in which the casing in the normal vertical orientation is rotated 90 degrees in a counterclockwise direction. The right horizontal orientation is an orientation of the casing in which the normal vertical orientation is rotated 90 degrees in a clockwise direction. In the case of the vertical model, a state thereof shown in FIG. 20 is the normal vertical orientation. In the case of the horizontal model, a state thereof shown in FIG. 21 is the left horizontal orientation or the right horizontal orientation.

The print setting 110 includes a sheet size 111, a setting mode 112, and a print orientation 113. The print setting 110 is stored in a nonvolatile storage area of the storage portion 12 (such as the flash memory). The print setting 110 may be stored in advance by the user, for example. The sheet size 111 is information defining a size (e.g., A4 size) of a recording sheet used for print or recording in the MFP 51. The setting mode 112 is information defining setting modes of the print orientation 113. The setting mode 112 includes "Fit Display Screen" and an input setting. The print orientation 113 is information defining a direction in which a print image is recorded or drawn on the recording sheet. The print orientation 113 is a parameter that is active where the setting mode 112 is the input setting.

The print orientation 113 includes a normal portrait, a vertically flipped portrait, a right landscape, a left landscape, and "Fit Sheet". The normal portrait is an orientation in which the user facing a print face of the recording sheet can properly view or read the print image where the rectangular recording sheet is placed such that a short side thereof extends in the horizontal direction, and a long side thereof extends in the perpendicular direction (this way of the placement of the recording sheet may be called portrait placement). The vertically flipped portrait is an orientation in which the recording sheet in the normal portrait is rotated 180 degrees. The landscape is an orientation in which the user facing the print face of the recording sheet can properly view or read the print image where the rectangular recording sheet is placed such that the long side thereof extends in the horizontal direction, and the short side thereof extends in the perpendicular direction (this way of the placement of the recording sheet may be called landscape placement). The right landscape is an orientation in which the recording sheet in the normal portrait is rotated 90 degrees in the clockwise direction. The left landscape is an orientation in which the recording sheet in the normal portrait is rotated 90 degrees in the counterclockwise direction.

The button input portion 17 is for receiving the operation of the user for the mobile phone 10. The button input portion 17 is constructed integrally with the panel 18 as a touch panel. The panel 18 displays thereon various functional information of the mobile phone 10. The geomagnetic sensor 25 is a sensor for detecting an earth's geomagnetism to find a direction in which a distal end portion of the mobile phone 10 faces. The acceleration sensor 26 is a sensor for detecting a positional change of a weight to measure acceleration of the mobile phone 10. The camera portion 27 is for capturing a predetermined area by, e.g., a CCD to obtain image data. The inclination sensor 29 is a sensor for detecting an angular velocity to measure an inclination angle of the mobile phone 10 with respect to a horizontal plane. The GPS portion 30 is a sensor using an artificial satellite to provide a location information about a position of the mobile phone 10 on the Earth.

There will be next explained an operation of the communication system 1 with reference to FIGS. 2-22. First, there will be explained an operation for sharing data in the browser application 21*b*, with the print application 21*a*. When the user has started or launched the browser application 21*b* via the button input portion 17, the CPU 11 starts or launches the browser application 21*b*. In S5, the CPU 11 obtains, from the web server 71, web data identified by a uniform resource locator (URL) specified by the user. The CPU 11 stores the obtained web data into the storage portion 12.

In S7, the CPU 11 uses the API to obtain the casing orientation information 103 from the inclination sensor 29. The CPU 11 then uses the obtained casing orientation information 103 to calculate the orientation of the casing of the mobile phone 10 and stores the calculated orientation into the storage portion 12. In S9, the CPU 11 displays a web image on the panel 18 on the basis of the web data. Specifically, a data sharing button is displayed on the panel 18. The data sharing button is a button used to input a data sharing command for sharing data among the browser application 21*b* and other applications.

In S11, the CPU 11 judges whether the orientation of the casing of the mobile phone 10 has been changed or not. Where the CPU 11 has judged that the orientation has been changed (S11: YES), the CPU 11 returns to S7. Where the CPU 11 has judged that the orientation has not been changed (S11: NO), the CPU 11 goes to S13.

In S13, the CPU 11 judges whether the user has inputted the data sharing command or not. Specifically, the CPU 11 judges whether the user has touched the data sharing button or not. Where the CPU 11 has judged that the data sharing command has not been inputted (S13: NO), the CPU 11 returns to S5. On the other hand, where the CPU 11 has judged that the data sharing command has been inputted (S13: YES), the CPU 11 displays, on the panel 18, a list of the applications with which the browser application 21*b* shares the data. In this example, on the panel 18 are displayed buttons respectively for selecting the print application 21a and the text editing application 21c.

In S15, the CPU 11 judges whether or not the print application 21a has been selected as an application with which the browser application 21b shares URL data. Specifically, the CPU 11 judges whether or not the user has touched the button for selecting the print application 21a. Where the CPU 11 has judged that the print application 21a has not been selected (S15: NO), the CPU 11 goes to S19 in which various processings are executed by another application. On the other hand, where the CPU 11 has judged that the print application 21a has been selected (S15: YES), the CPU 11 goes to S17. In S17, the CPU 11 outputs a text file containing a URL for accessing the web page displayed in the form of the web image (e.g., http://www.xxx.com), and this flow is finished.

There will be next explained, with reference to FIG. 3, an operation of the print application 21a where the URL is passed from another application. In S41, the CPU 11 judges whether data including the URL has been passed from another application or not. For example, where the mobile phone 10 uses Android™ that is an operating system for the mobile phone, the CPU 11 judges whether an object (called "Intent") for passing the data among the applications has been passed or not. Where the CPU 11 has judged that the data including the URL has not been passed (S41: NO), the CPU 11 repeats S41. On the other hand, the CPU 11 has judged that the data has been passed (S41: YES), the CPU 11 goes to S43.

In S43, the CPU 11 downloads web-page data (HTML data) identified by the URL, via the wireless communication 210. The CPU 11 then creates image data on the basis of the web-page data and stores the image data into the RAM of the storage portion 12.

Further, the CPU 11 obtains an orientation of the image data and stores the obtained orientation into the RAM. The orientation of the image data includes a vertical orientation shown in FIG. 6 and a horizontal orientation shown in FIG. 7. The image data in the vertical orientation is image data in which the user facing a rectangular image G1 displayed on the panel 18 on the basis of the image data can view or read the image G1 accurately where the image G1 is displayed such that a short side L1 thereof extends in the horizontal direction, and a long side L2 thereof extends in the perpendicular direction. The image data in the horizontal orientation is image data in which the user facing the rectangular image G1 displayed on the panel 18 on the basis of the image data can view or read the image G1 accurately where the image G1 is displayed such that the long side L2 thereof extends in the horizontal direction, and the short side L1 thereof extends in the perpendicular direction.

In S45, the CPU 11 obtains the print setting 110. Specifically, the CPU 11 reads out the sheet size 111, the setting mode 112, and the print orientation 113 from the set-value storage area 12a and transfers or loads them into the RAM. In S47, the CPU 11 judges whether the mode of the setting mode 112 is the "Fit Display Screen" setting or not. Where the CPU 11 has judged that the mode of the setting mode 112 is the "Fit Display Screen" setting (S47: YES), the CPU 11 goes to S49 to execute a print processing A. On the other hand, where the CPU 11 has judged that the mode of the setting mode 112 is not the "Fit Display Screen" setting (S47: NO), the CPU 11 goes to S51 to execute a print processing B, and this flow is finished.

<Print Processing A>

Figure 4:
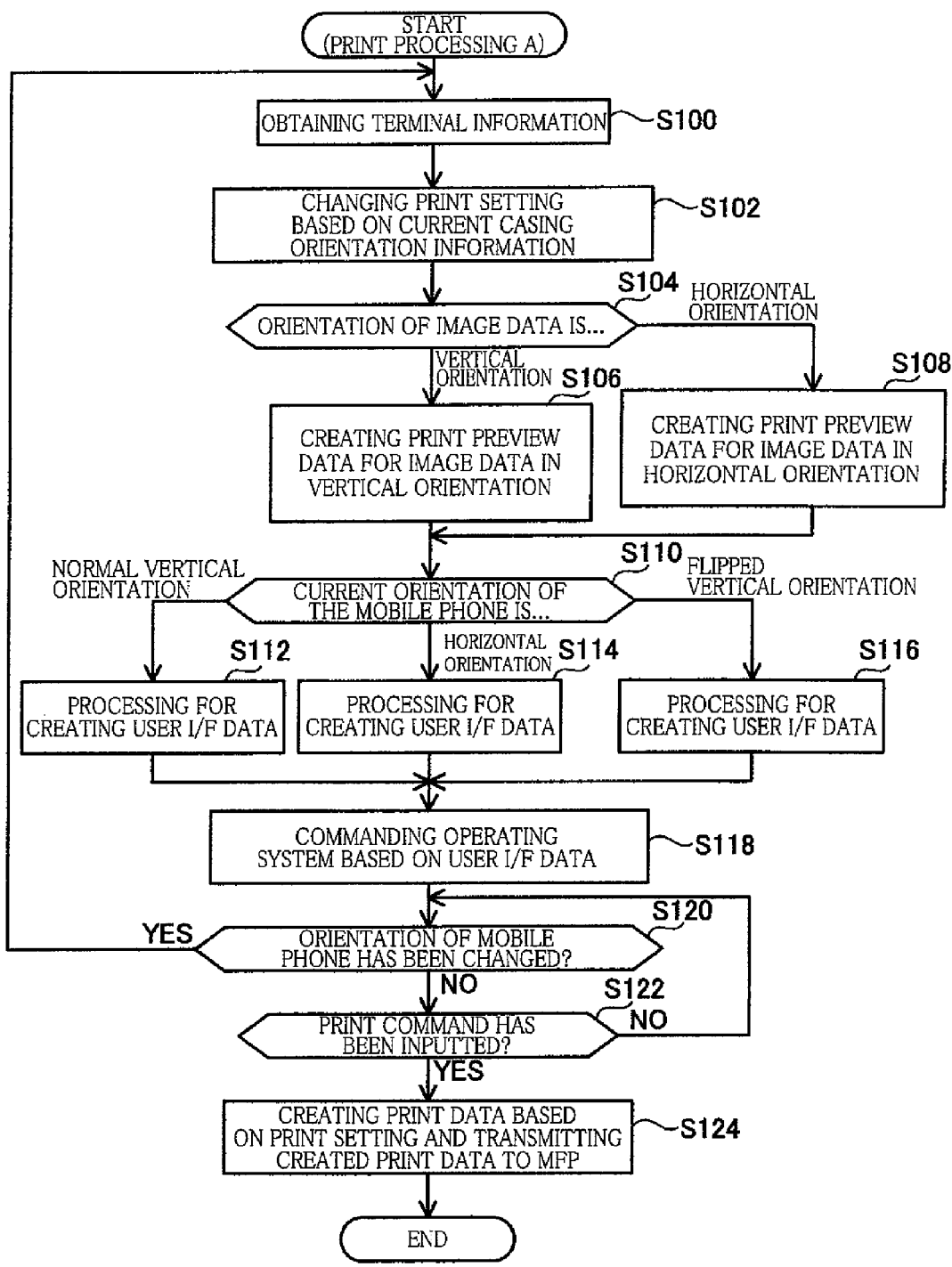
FIG. 4 is a flow-chart showing the operation of the mobile phone.

There will be next explained the print processing A in S49 with reference to FIG. 4. In S100, the CPU 11 obtains the terminal information 100. Specifically, the CPU 11 queries the operating system 21e to obtain the model information 101, the vertical and horizontal setting 102, the casing orientation information 103 and stores them into the RAM of the storage portion 12.

In S102, the CPU 11 changes the print setting 110 on the basis of current casing orientation information 103 obtained in S100. Specifically, where the casing orientation information 103 is the normal vertical orientation, the print orientation 113 is set as the normal portrait. Where the casing orientation information 103 is the flipped vertical orientation, the print orientation 113 is set as the vertically flipped portrait. Where the casing orientation information 103 is the right horizontal orientation, the print orientation 113 is set as the right landscape. Where the casing orientation information 103 is the left horizontal orientation, the print orientation 113 is set as the left landscape. That is, S102 is a step for setting the print orientation when the image data has been stored into the storage portion 12 in S43 (this operation functions as a trigger) in response to the acceptance of the input of the user by the button input portion 17 in S13.

Next, in S104-S108, the CPU 11 executes a processing for creating print preview data. In S104, the CPU 11 reads out the orientation of the image data obtained in S43 from the RAM and judges the orientation of the image data. Where the CPU 11 has judged that the orientation of the image data is the vertical orientation, the CPU 11 goes to S106. In S106, the CPU 11 creates print preview data for the image data in the vertical orientation, on the basis of the print orientation 113 obtained in S45 (FIG. 3).

Figure 8:
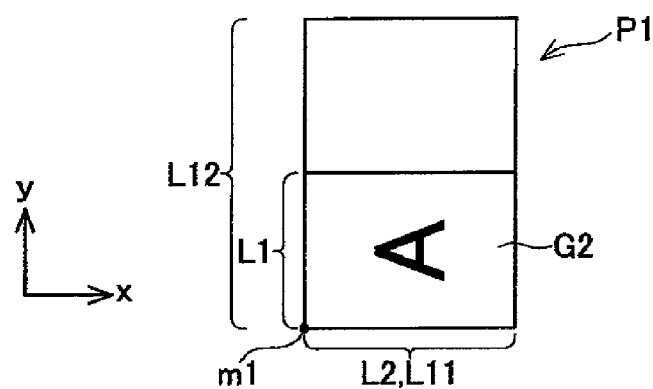
FIG. 8 is a view showing a print-preview-data create processing.
Figure 9:
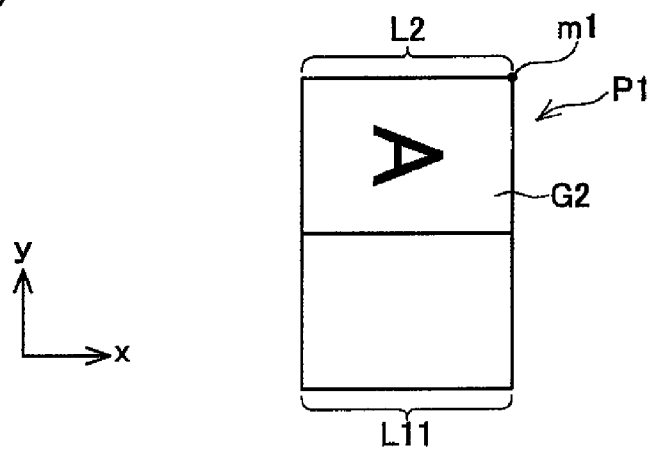
FIG. 9 is a view showing the print-preview-data create processing.
Figure 10:
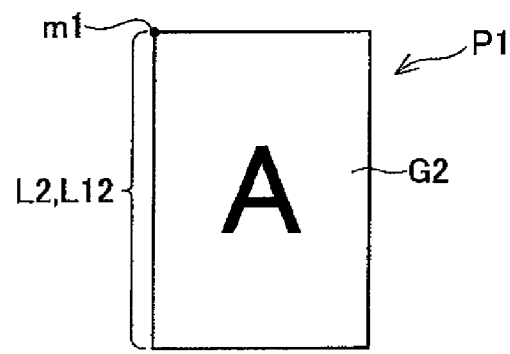
FIG. 10 is a view showing the print-preview-data create processing.
Figure 11:
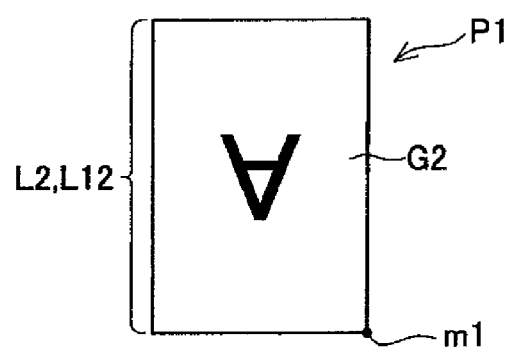
FIG. 11 is a view showing the print-preview-data create processing.
Figure 12:
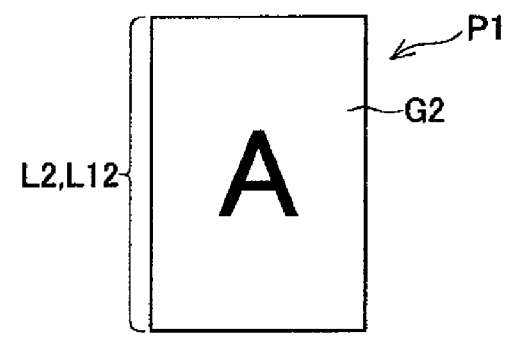
FIG. 12 is a view showing the print-preview-data create processing.

Here, there will be explained, with reference to FIGS. 8-12, a print-preview-data create processing for the image data being in the vertical orientation which is executed in S106. Where the print orientation 113 is the left landscape, as shown in FIG. 8, a drawing starting point m1 of a print preview image G2 formed based on the print preview data is set at a lower left corner of the recording sheet P1. The drawing starting point m1 is a point from which drawing of the print preview image G2 is started and which defines the orientation of the image data. Drawing of the print preview image G2 in a widthwise direction thereof or in a direction in which a short side L1 extends is performed along an upward and downward direction of the recording sheet P1 or a y direction. Drawing of the print preview image G2 in a vertical direction or in a direction in which a long side L2 extends is performed along a rightward and leftward direction of the recording sheet P1 or an x direction. That is, the drawing of the print preview image G2 is performed such that a length of the print preview image G2 in the vertical direction (the long side L2) is equal to a length of the recording sheet P1 in the rightward and leftward direction (the short side L11).

Where the print orientation 113 is the right landscape, as shown in FIG. 9, the drawing starting point m1 of the print preview image G2 is set at an upper right corner of the recording sheet P1. The drawing of the print preview image G2 is performed such that the length of the print preview image G2 in the vertical direction (the long side L2) is equal to the length of the recording sheet P1 in the rightward and leftward direction (the short side L11).

Where the print orientation 113 is the normal portrait, as shown in FIG. 10, the drawing starting point m1 of the print preview image G2 is set at an upper left corner of the recording sheet P1. The drawing of the print preview image G2 is performed such that the length of the print preview image G2 in the vertical direction (the long side L2) is equal to a length of the recording sheet P1 in the upward and downward direction (the long side L12).

Where the print orientation 113 is the vertically flipped portrait, as shown in FIG. 11, the drawing starting point m1 of the print preview image G2 is set at a lower right corner of the recording sheet P1. The drawing of the print preview image G2 is performed such that the length of the print preview image G2 in the vertical direction (the long side L2) is equal to the length of the recording sheet P1 in the upward and downward direction (the long side L12).

Where the print orientation 113 is the "Fit Sheet", as shown in FIG. 12, the drawing of the print preview image G2 is performed such that the print preview image G2 fits the recording sheet P1. This drawing is performed such that the length of the print preview image G2 in the vertical direction (the long side L2) is equal to the length of the recording sheet P1 in the upward and downward direction (the long side L12).

Where the CPU 11 has judged in S104 that the orientation of the image data is the horizontal orientation, the CPU 11 goes to S108. In S108, the CPU 11 creates print preview data for the image data in the horizontal orientation, on the basis of the print orientation 113 obtained in S45 (FIG. 3).

Figure 13:
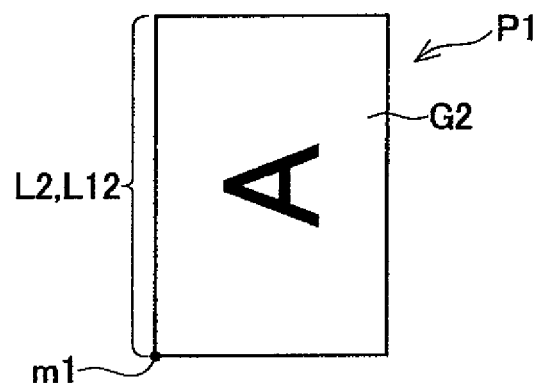
FIG. 13 is a view showing the print-preview-data create processing.
Figure 14:
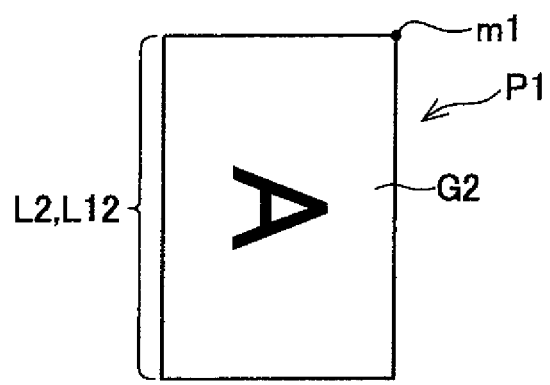
FIG. 14 is a view showing the print-preview-data create processing.
Figure 15:
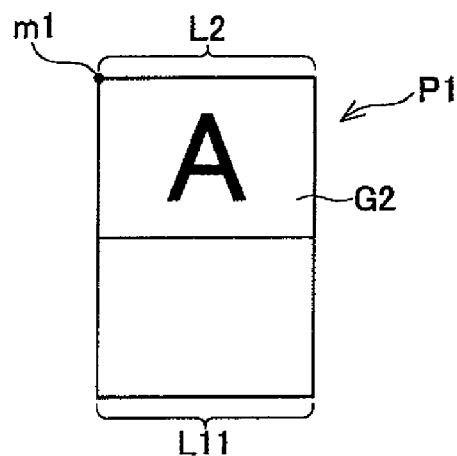
FIG. 15 is a view showing the print-preview-data create processing.
Figure 16:
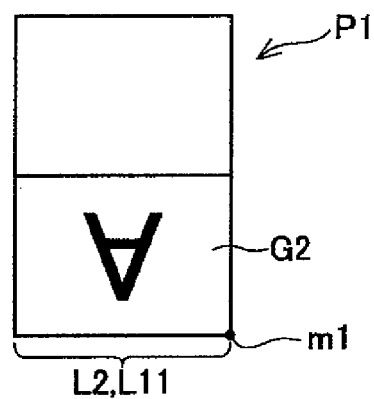
FIG. 16 is a view showing the print-preview-data create processing.
Figure 17:
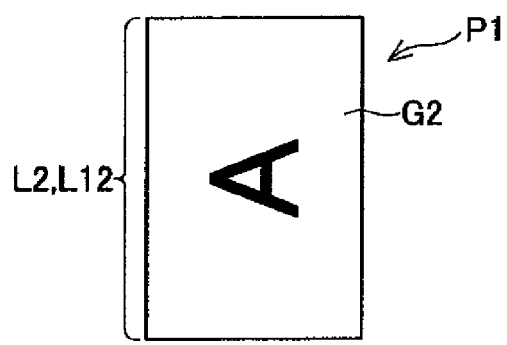
FIG. 17 is a view showing the print-preview-data create processing.

Here, there will be explained, with reference to FIGS. 13-17, a print-preview-data create processing for the image data being in the horizontal orientation which is executed in S108. Where the print orientation 113 is the left landscape, as shown in FIG. 13, the drawing starting point m1 of the print preview image G2 formed based on the print preview data is set at the lower left corner of the recording sheet P1. The drawing of the print preview image G2 is performed such that a length of the print preview image G2 in the horizontal direction (the long side L2) is equal to the length of the recording sheet P1 in the upward and downward direction (the long side L12). Where the print orientation 113 is the right landscape, as shown in FIG. 14, the drawing starting point m1 of the print preview image G2 is set at the upper right corner of the recording sheet P1. The drawing of the print preview image G2 is performed such that the length of the print preview image G2 in the horizontal direction (the long side L2) is equal to the length of the recording sheet P1 in the upward and downward direction (the long side L12). Where the print orientation 113 is the normal portrait, as shown in FIG. 15, the drawing starting point m1 of the print preview image G2 is set at the upper left corner of the recording sheet P1. The drawing of the print preview image G2 is performed such that the length of the print preview image G2 in the horizontal direction (the long side L2) is equal to the length of the recording sheet P1 in the rightward and leftward direction (the short side L11). Where the print orientation 113 is the vertically flipped portrait, as shown in FIG. 16, the drawing starting point m1 of the print preview image G2 is set at the lower right corner of the recording sheet P1. The drawing of the print preview image G2 is performed such that the length of the print preview image G2 in the horizontal direction (the long side L2) is equal to the length of the recording sheet P1 in the rightward and leftward direction (the short side L11). Where the print orientation 113 is the "Fit Sheet", as shown in FIG. 17, the drawing of the print preview image G2 is performed such that the print preview image G2 fits the recording sheet P1. This drawing of the print preview image G2 is performed such that the length of the print preview image G2 in the vertical direction (the long side L2) is equal to the length of the recording sheet P1 in the upward and downward direction (the long side L12).

Then in S110-S116, the CPU 11 executes a processing for creating user I/F (interface) data. In S110, the CPU 11 judges a current orientation of the mobile phone 10. Specifically, the CPU 11 reads out the casing orientation information 103 obtained in S100 from the RAM and executes the judgment. Where the CPU 11 has judged that the casing orientation information 103 is the normal vertical orientation, the CPU 11 judges that the print orientation 113 is the portrait, and the CPU 11 goes to S112.

Here, there will be explained a user-I/F-data create processing in S112 with reference to a table in FIG. 18. Where the model information 101 is the vertical model or a model in which the vertical and horizontal setting 102 is fixed to the vertical setting, the CPU 11 creates data for displaying one of user I/Fs of a first pattern in the table in FIG. 18. The user I/F data of the first pattern is data for commanding the operating system 21e to display a title "PRINT PREVIEW" on a top (uppermost portion) of the panel 18 and display the print preview image G2 on a lower side of the title, as seen from a reference position R1. It is noted that the reference position R1 is located on an upper left corner of the panel 18 where the casing orientation information 103 is the normal vertical orientation.

Figure 18:
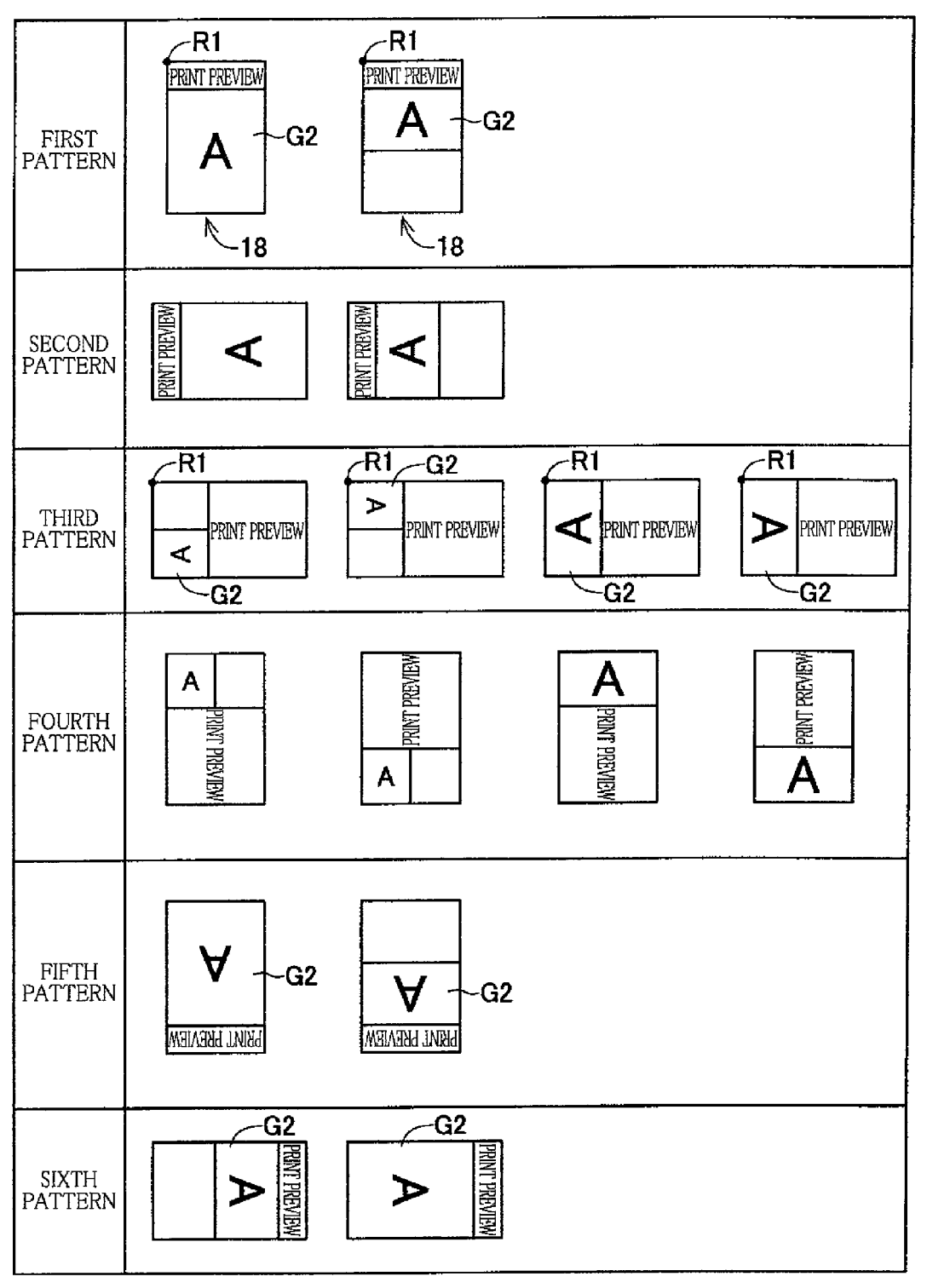

Further, where the model information 101 is the horizontal model or a model in which the vertical and horizontal setting 102 is fixed to the horizontal setting, the CPU 11 creates data for displaying one of user I/Fs of a second pattern in the table in FIG. 18. The user I/F data of the second pattern is data for commanding the operating system 21e to display one of the user I/Fs obtained by rotating the user I/Fs of the first pattern 90 degrees in the counterclockwise direction.

On the other hand, where the CPU 11 has judged that the casing orientation information 103 is the horizontal orientation, the CPU 11 judges that the print orientation 113 is the landscape, and the CPU 11 goes to S114. Here, there will be explained a user-I/F-data create processing in S114 with reference to the table in FIG. 18. Where the model information 101 is the horizontal model or the model in which the vertical and horizontal setting 102 is fixed to the horizontal setting, the CPU 11 creates data for displaying one of user I/Fs of a third pattern in the table in FIG. 18. The user I/F data of the third pattern is data for commanding the operating system 21e to display the print preview image G2 on a left portion of the panel 18 and display the title "the print preview" on a right side of the print preview image G2. It is noted that the reference position R1 is located on the upper left corner of the panel 18 where the casing orientation information 103 is the horizontal orientation.

Where the model information 101 is the vertical model or the model in which the vertical and horizontal setting 102 is fixed to the vertical setting, the CPU 11 creates data for displaying one of user I/Fs of a fourth pattern in the table in FIG. 18. The user I/F data of the fourth pattern is data for commanding the operating system 21e to display one of the user I/Fs obtained by rotating the user I/Fs of the third pattern 90 degrees in the clockwise direction or the counterclockwise direction.

On the other hand, where the CPU 11 has judged in S110 that the casing orientation information 103 is the flipped vertical orientation, the CPU 11 judges that the print orientation 113 is the portrait, and the CPU 11 goes to S116. Here, there will be explained a user-I/F-data create processing in S116 with reference to the table in FIG. 18. Where the model information 101 is the vertical model or the model in which the vertical and horizontal setting 102 is fixed to the vertical setting, the CPU 11 creates data for displaying one of user I/Fs of a fifth pattern in the table in FIG. 18. The user I/F data of the fifth pattern is data for commanding the operating system 21e to display the title "the print preview" on a bottom (lowermost portion) of the panel 18 and display the print preview image G2 on an upper side of the title.

Further, where the model information 101 is the horizontal model or the model in which the vertical and horizontal setting 102 is fixed to the horizontal setting, the CPU 11 creates data for displaying one of user I/Fs of a sixth pattern in the table in FIG. 18. The user I/F data of the sixth pattern is data for commanding the operating system 21e to display the title "the print preview" on a right portion of the panel 18 and display the print preview image G2 on a left side of the title.

In view of the above, the CPU 11 creates data for displaying the user I/F in the following manner. When the mobile phone 10 is in a first terminal orientation, the CPU 11 creates the user I/F such that a direction in which the long side L12 of the recording sheet P extends coincides with a direction in which the long side L2 of the image being in a first image orientation extends and such that a direction in which the short side L11 of the recording sheet P extends coincides with a direction in which the short side L12 of the image being in the first image orientation extends. When the mobile phone 10 is in a second terminal orientation, the CPU 11 creates the user I/F such that the direction in which the short side L11 of the recording sheet P extends coincides with a direction in which the long side L2 of the image being in a second image orientation extends and such that the direction in which the long side L12 of the recording sheet P extends coincides with a direction in which the short side L12 of the image being in the second image orientation extends. That is, the CPU 11 creates the user I/F shown in the left user I/F in the first pattern, the left user I/F in the second pattern, the right two user I/Fs in the third pattern, the right two user I/Fs in the fourth pattern, the left user I/F in the fifth pattern, and the right user I/F in the sixth pattern in FIG. 18.

In view of the above, the CPU 11 creates data for displaying the user I/F also in the following manner. When the mobile phone 10 is in the first terminal orientation, the CPU 11 creates the user I/F such that the direction in which the long side L12 of the recording sheet P extends coincides with the direction in which the short side L12 of the image being in the first image orientation extends and such that a direction in which the short side L11 of the recording sheet P extends coincides with the direction in which the long side L2 of the image being in the first image orientation extends. When the mobile phone 10 is in the second terminal orientation, the CPU 11 creates the user I/F such that the direction in which the short side L11 of the recording sheet P extends coincides with the direction in which the short side L12 of the image being in the second image orientation extends and such that the direction in which the long side L12 of the recording sheet P extends coincides with the direction in which the long side L2 of the image being in the second image orientation extends. That is, the CPU 11 creates the user I/F shown in the right user I/F in the first pattern, the right user I/F in the second pattern, the left two user I/Fs in the third pattern, the left two user I/Fs in the fourth pattern, the right user I/F in the fifth pattern, and the left user I/F in the sixth pattern in FIG. 18.

In S118, the CPU 11 commands the operating system 21e to display the user I/F on the panel 18 on the basis of the user I/F data. When having received the command transmitted from the CPU 11, the operating system 21e draws the user I/F from the reference position R1 on the panel 18.

In S120, the CPU 11 judges whether the orientation of the mobile phone 10 has been changed or not. Specifically, the CPU 11 judges whether or not the operating system 21e has generated an event indicating that the orientation of the casing of the mobile phone 10 has been changed or rotated about 90 degrees. Where the CPU 11 has judged that the orientation has been changed (S120: YES), the CPU 11 returns to S100. Where the CPU 11 has judged that the orientation has not been changed (S120: NO), the CPU 11 goes to S122.

In S122, the CPU 11 judges whether the print command has been inputted or not. The print command is inputted when the user has touched a print button displayed on the panel 18, for example. Where the CPU 11 has judged that the print command has not been inputted (S122: NO), the CPU 11 returns to S120. Where the CPU 11 has judged that the print command has been inputted (S122: YES), the CPU 11 goes to S124. In S124, the CPU 11 creates the print data on the basis of the print setting 110. The processing for creating the print data includes a processing for changing a resolution and a processing for attaching information representative of recording data described using PostScript, for example. Further, the CPU 11 controls the wireless transmitting and receiving portion 15 to transmit the created print data to the MFP 51. The MFP 51 prints or records an image on the recording sheet on the basis of the print data transmitted from the mobile phone 10, and this flow is finished.

<Print Processing B>

Figure 5:
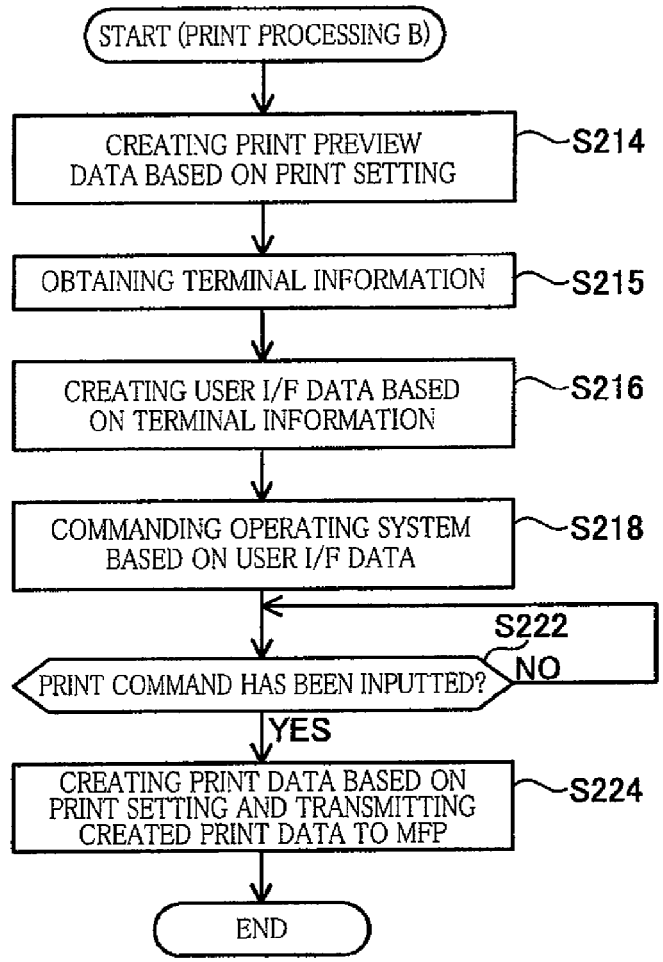
FIG. 5 is a flow-chart showing the operation of the mobile phone.
Figure 6:
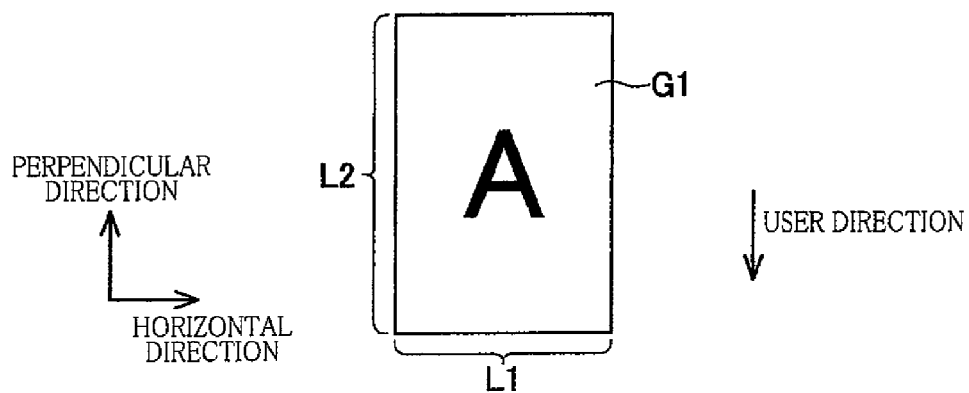
FIG. 6 is a view showing an orientation of the image data.
Figure 7:
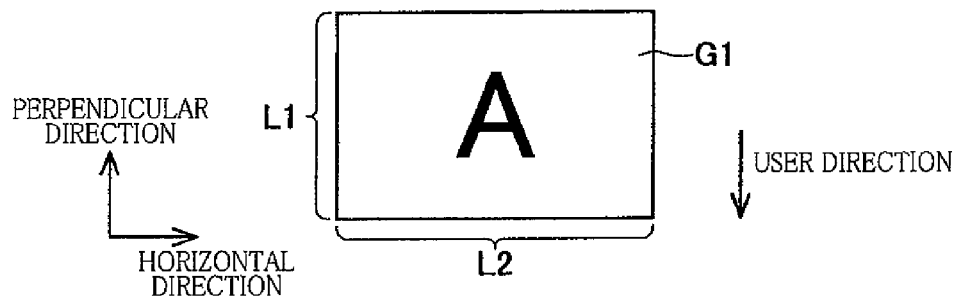
FIG. 7 is a view showing the orientation of the image data.

There will be next explained the print processing B in S51 with reference to FIG. 5. In S214, the CPU 11 creates the print preview data on the basis of the print setting 110. It is noted that the processing in S214 is the same as the processings in S104-S108 (in FIG. 4) of the print processing A, and an explanation of which is dispensed with. In S215, the CPU 11 obtains the terminal information 100. It is noted that the processing in S215 is the same as the processing in S100 of the print processing A, and an explanation of which is dispensed with.

In S216, the CPU 11 creates user I/F data on the basis of the terminal information 100. Here, there will be explained a user-I/F-data create processing in S216 with reference to a table in FIG. 19. Where the model information 101 is the vertical model, or the vertical and horizontal setting 102 is fixed to the vertical setting, or the current casing orientation information 103 is the vertical orientation, the CPU 11 creates data for displaying one of user I/Fs of a first pattern in the table in FIG. 19. The user I/F data of the first pattern is data for commanding the operating system 21e to display the title "the print preview" on the top (uppermost portion) of the panel 18 and display the print preview image G2 on a lower side of the title.

Figure 19:
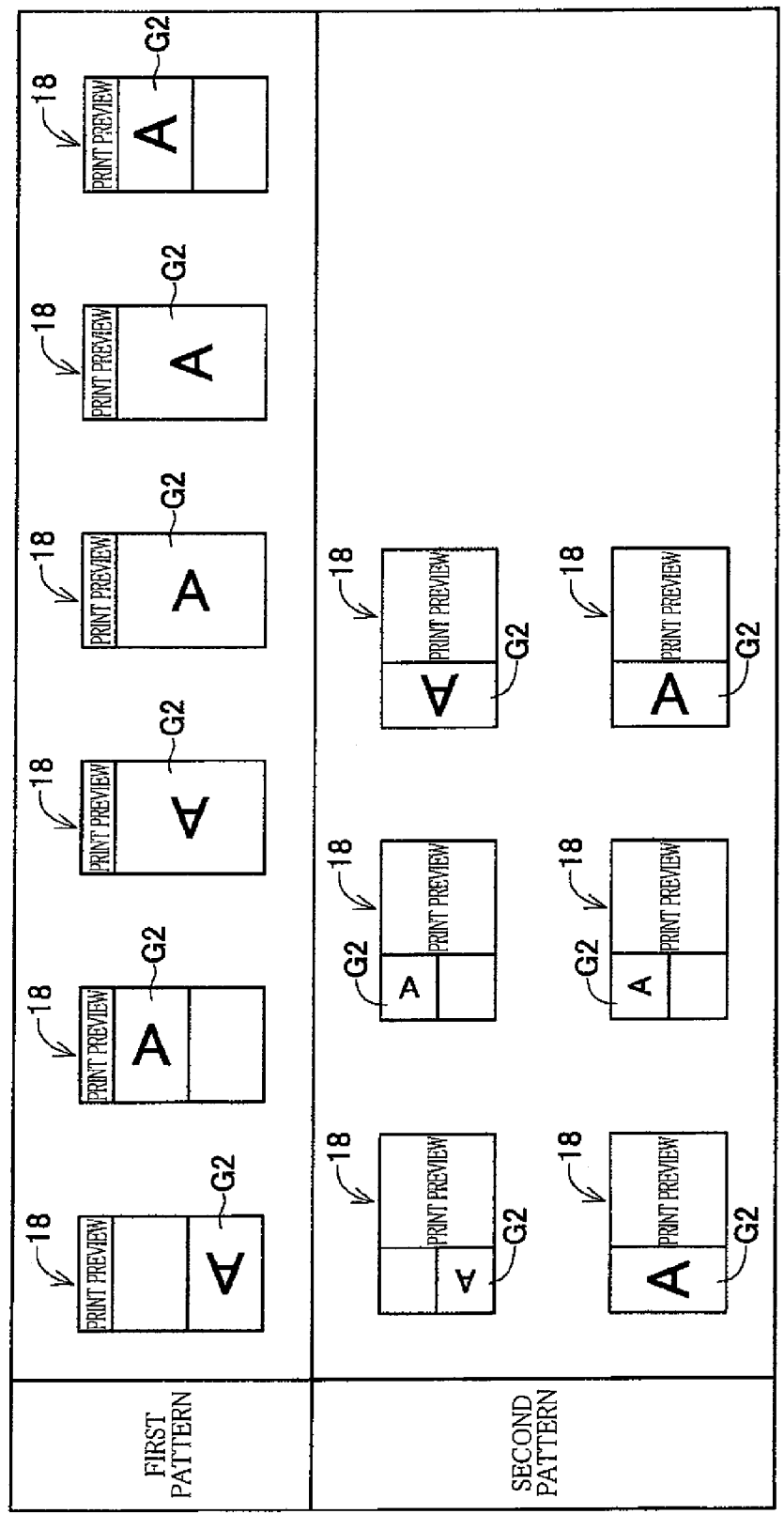
FIG. 19 is a table showing the user-I/F-data create processing.

Further, where the model information 101 is the horizontal model, or the vertical and horizontal setting 102 is fixed to the horizontal setting, or the current casing orientation information 103 is the horizontal orientation, the CPU 11 creates data for displaying one of user I/Fs of a second pattern in the table in FIG. 19. The user I/F data of the second pattern is data for commanding the operating system 21e to display the print preview image G2 on a left portion of the panel 18 and display the title "the print preview" on a right side of the print preview image G2.

In S218, the CPU 11 commands the operating system 21e to display the user I/F on the panel 18 on the basis of the user I/F data. In S222, the CPU 11 judges whether the print command has been inputted or not. Where the CPU 11 has judged that the print command has not been inputted (S222: NO), the CPU 11 repeats S222. Where the CPU 11 has judged that the print command has been inputted (S222: YES), the CPU 11 goes to S224. In S224, the CPU 11 creates the print data on the basis of the print setting 110 and controls the wireless transmitting and receiving portion 15 to transmit the created print data to the MFP 51, and this flow is finished.

<Effects>

This mobile phone 10 sets the print orientation 113 in S102 by using the casing orientation information 103 obtained by the inclination sensor 29. That is, the operation for setting the print orientation 113 is made possible only by changing the position or the orientation (posture) of the mobile phone 10. Thus, the user can set the print orientation 113 without a button input or a display of a print setting screen. Further, the user can intuitively set the print orientation 113, making it possible to increase a user's convenience.

In this mobile phone 10, the print orientation 113 can be set at a timing when the image data has been stored into the storage portion 12 in S43. As a result, the user can perform a trigger operation for starting a preparation of the printing in a state in which the mobile phone 10 is in a desired orientation, making it possible for the user to obtain a desired printing result.

In this mobile phone 10, the print orientation 113 and the like can be set by changing the orientation of the mobile phone 10 at a timing before the print preview image G2 is displayed on the panel 18. As a result, it is possible to prevent the arising of a need for the user to operate, e.g., the button input portion 17 of the mobile phone 10 to change the parameter such as the print orientation 113 at a timing after the print preview image G2 has been displayed. Thus, it is possible to reliably set the print orientation 113 and the like intuitively only by changing the orientation of the mobile phone 10.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

<Modifications>

Figure 23:
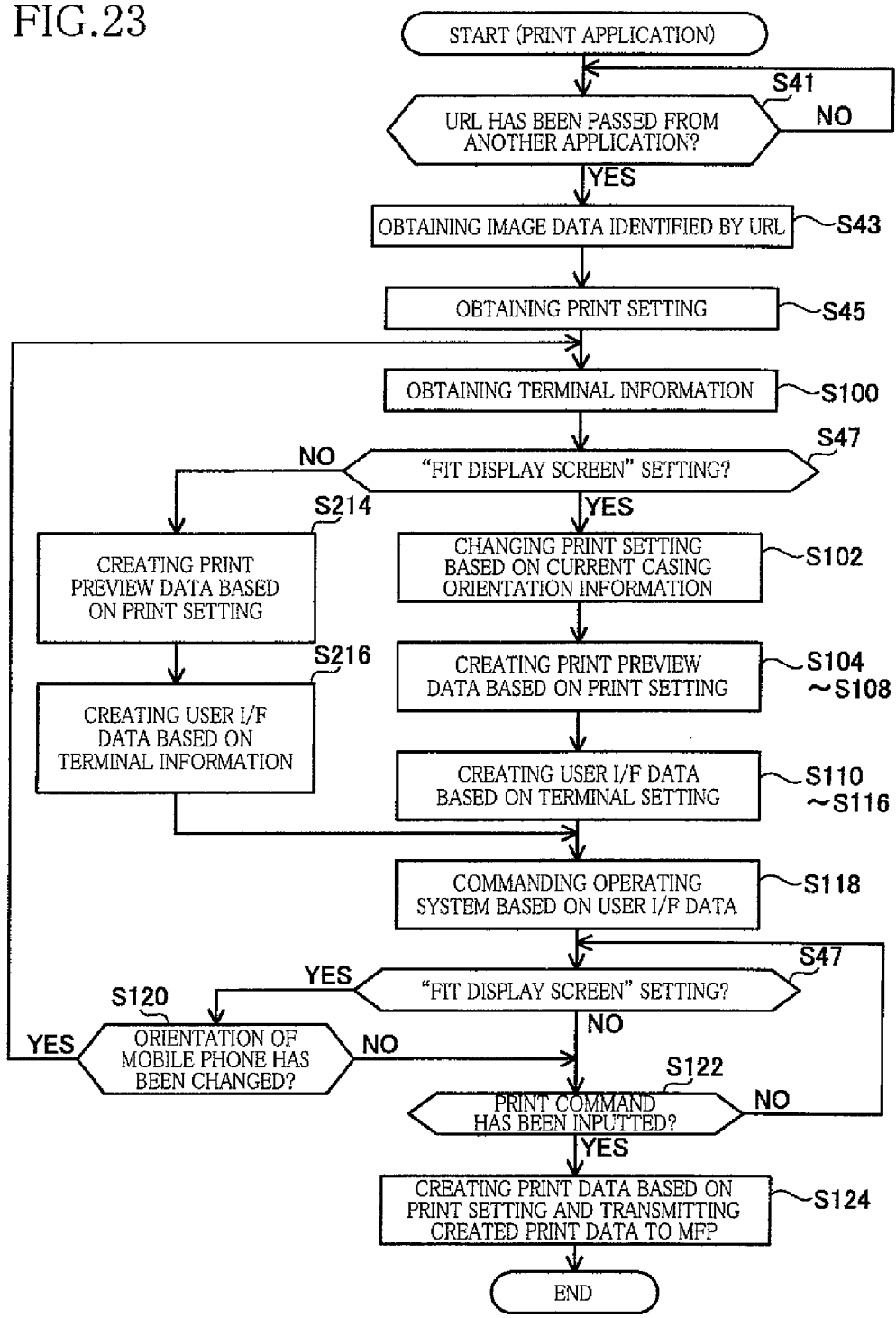
FIG. 23 is a flow-chart showing the operation of the mobile phone.

The order of the steps may be changed in the flows in FIGS. 3-5. For example, the steps in FIGS. 3-5 may be combined as shown in a flow in FIG. 23. It is noted that the same step numbers as used in the flows in FIGS. 3-5 are used to designate the corresponding steps in the flow in FIG. 23, and an explanation of which is dispensed with. Also in this flow shown in FIG. 23, the user can intuitively set the print orientation 113.

A physical quantity for controlling the print-preview-data create processing is not limited to the inclination angle measured by the inclination sensor 29, and other physical quantities may be used. For example, where the acceleration measured by the acceleration sensor 26 is used, the user can change the print orientation 113 by shaking or waving the mobile phone 10. Further, where positional information of the mobile phone 10 which is measured by the GPS portion 30 is used, the user can change the print orientation 113 by moving the mobile phone 10. That is, the word "move" or "movement" used in the present application includes an action of the mobile phone 10 which is caused by the shake of the mobile phone 10 and a movement of the mobile phone 10 which is caused by the user carrying the mobile phone 10.

The display manners of the panel 18 shown in FIGS. 18 and 19 are shown as examples, and other display manners may be used. Further, in FIGS. 18 and 19, the print preview image G2 is displayed on a left side of the panel 18, for example. The print preview image G2 may be displayed at any position.

Further, in S110, the user I/F data may be different between the case where the casing orientation information 103 is the left horizontal orientation and the case where the casing orientation information 103 is the right horizontal orientation. For example, the mobile phone 10 may be configured so as to perform "2 in 1" display (in which two print preview images are displayed on the panel 18) in the case of the left horizontal orientation and so as to perform "1 in 1" display (in which a single print preview image is displayed on the panel 18) in the case of the right horizontal orientation.

The reference position R1 of the panel 18 as the starting point of the drawing of the user I/F is not limited to the upper left corner of the panel 18. The reference position R1 may be set at any position depending upon a type of the mobile phone 10.

Further, the CPU 11 may be configured to command the motion sensor via the API of the operating system 21e such that the motion sensor sends or returns the sensor information only while the mobile phone 10 is in a predetermined state. The mobile phone 10 may be designed in advance such that the motion sensor outputs the sensor information only while the mobile phone 10 is in a predetermined state. For example, the mobile phone 100 may be configured such that the inclination information is obtained from the inclination sensor 29 only while the preview operation button displayed on the panel 18 is touched by the user. As a result, the output of the sensor is obtained only in a period in which the mobile phone 10 is in the predetermined state.

Further, the image data may be obtained in S43 by any method. For example, the image data may be obtained from the MFP 51 via the wireless communication 211 and may be obtained from a nonvolatile storage medium such as a memory mounted in a memory slot, not shown.

The device to which the present invention is applied is not limited to the mobile phone 10, and the present invention is applicable to various devices such as a note PC and a tablet device.

The buttons such as the data sharing button, the button for selecting the print application 21a, a button for selecting the text editing application 21c, and the print button are not limited to be displayed on the touch panel of the panel 18. For example, these buttons may be provided by hard keys of the mobile phone 10.

In the present embodiment, the CPU 11 operating based on the print application 21a executes various processings. However, the present invention is not limited to this configuration. As one modification, the CPU 11 operating based on the print application 21a may command the operating system 21e, other programs, and hardware such as the panel 18 to execute various processings in the following manners.

For example, the CPU 11 may command the operating system 21e to transmit the print data to the MFP 51. In this case, the CPU 11 (operating based on the print application 21a) commands the operating system 21e in S124 and S224 to execute the processing for transmitting the print data, for example.

The CPU 11 may execute the processing for storing the image data into the RAM, on the basis of the processing executed by the operating system 21e. In this case, the CPU 11 (operating based on the print application 21a) commands the operating system 21e in S43 to execute the storing processing, for example.

The CPU 11 may execute the processing for determining the print orientation 113, on the basis of the processing executed by the operating system 21e. In this case, the CPU 11 (operating based on the print application 21a) commands the operating system 21e in S102 to determine the print orientation 113 on the basis of the casing orientation information 103, for example.

The CPU 11 may create the print preview data, on the basis of the processing executed by the operating system 21e. In this case, the CPU 11 (operating based on the print application 21a) commands the operating system 21e in S106 and S108 to create the print preview data on the basis of the print orientation 113, for example.

The CPU 11 may execute the processing for displaying the user I/F on the panel 18, on the basis of the processing executed by the operating system 21e. In this case, the CPU 11 (operating based on the print application 21a) commands the operating system 21e in S118 to display the user I/F on the panel 18, for example.

The CPU 11 may execute the processing for judging whether the data sharing command has been inputted or not, on the basis of the processing executed by the operating system 21e. In this case, the CPU 11 (operating based on the browser application 21b) commands the operating system 21e in S13 to judge whether the data sharing command has been inputted or not, for example.

In the present embodiment, the CPU 11 operating based on the print application 21a (as one example of an image-forming-data transmitting program) creates the print preview data and the user I/F data. That is, the CPU 11 operates on the basis of the print application 21a. However, the present invention is not limited to this configuration. For example, the CPU 11 operating based on an image-forming-data transmitting program of the operating system 21e may create the print preview data and other data. In this case, the print application 21a outputs a command for creating the print preview image, and the API creates the print preview image on the basis of the command. Further, a print-preview-image producing circuit may create the print preview data, for example. In this case, the mobile phone 10 needs to include hardware such as the print-preview-image producing circuit. Further, the mobile phone 10 needs to be configured such that the print application 21a outputs the command for creating the print preview image, and the print-preview-image producing circuit creates the print preview image on the basis of the command.

In S100, the CPU 11 may obtain the casing orientation information 103 detected by the inclination sensor 29, on the basis of the print application 21a without using the operating system 21e, and may store the obtained casing orientation information 103 into the storage portion 12.

In S120, the judgment of whether the orientation of the mobile phone 10 has been changed or not may be executed by the following modifications. Each time when the CPU 11 has received the casing orientation information 103 transmitted from the operating system 21e, the CPU 11 judges whether the orientation of the casing of the mobile phone 10 has been changed or not by judging whether the received casing orientation information 103 is different from the casing orientation information 103 obtained in S100 or not on the basis of the print application 21a.

The technological elements described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and have technological utility by achieving one of these objects.

It is noted that each program may be constituted by a single program module or may be constituted by a plurality of program modules. Another component may be used for each of the components described above as long as said another component has the same function. The above-described examples may be: a computer (e.g., the CPU 11) configured to execute a processing based on an image processing program (e.g., the print application 21a); a computer (such as the operating system and other applications) configured to execute a processing based on a program other than the image processing program; hardware (e.g., the panel 18) operated based on the command of the computer; and a configuration including both of the computer and the hardware. It should be noted that the above-described examples may be: a computer configured to execute a processing by executing processings based on a plurality of programs together with one another; and hardware operated based on a command of the computer configured to execute the processing by executing the processings based on the plurality of programs together with one another.

What is claimed is:

1. A non-transitory storage medium storing an image-forming-data transmitting program readable by a computer of a mobile terminal, the mobile terminal comprising:
   an operation portion configured to accept a starting operation;
   a sensor configured to output sensor information indicating at least one of a movement and an orientation of the mobile terminal;
   a communication portion configured to communicate with an image forming apparatus that is configured to form an image based on image forming data;
   a data storage portion storing image data; and
   a display configured to display thereon an image on the basis of the image data, the image-forming-data transmitting program being designed to have the computer function as:
   a parameter determining section configured to determine a parameter for image forming on the basis of the sensor information outputted by the sensor;
   an image-forming-data-creation controlling section configured to control a first creating section to create image forming data based on the image data stored in the data storage portion, by using the parameter determined by the parameter determining section;
   an image-forming-data-transmission controlling section configured to control the communication portion to transmit, to the image forming apparatus, the image forming data created by the first creating section;
   a preview-data-creation controlling section configured to control a second creating section to create preview data based on the image data stored in the data storage portion, by using the parameter determined by the parameter determining section; and
   a preview-image display section configured to display, on the display, a preview image based on the preview data created by the second creating section,
   wherein the image-forming-data-transmission controlling section is configured to control the communication portion to execute a processing for transmitting the image forming data created by the first creating section to the image forming apparatus on condition that the preview-image display section has displayed the preview image,
   wherein the parameter determining section is configured to determine the parameter for the image forming when image data selected by a function of the computer according to an external program has been stored into the data storage portion in response to the acceptance of the starting operation by the operation portion when an operation screen is being displayed on the display by the function of the computer according to the external program, and
   wherein, when the parameter determining section has determined the parameter, the preview-data-creation controlling section controls the second creating section to create the preview data based on the image data stored in the data storage portion, by using the parameter determined by the parameter determining section.

2. The non-transitory storage medium according to claim 1, wherein the operation portion is further configured to accept an operation for selecting the image displayed on the display, wherein the parameter determining section is configured to determine the parameter for the image forming when the data storage portion has stored image data corresponding to the image selected by the operation, and wherein, when the parameter determining section has determined the parameter, the image-forming-data-creation controlling section controls the first creating section to create image forming data on the basis of the image data stored in the data storage portion.

3. The non-transitory storage medium according to claim 1, wherein the image-forming-data transmitting program is designed to have the computer further function as:

a user interface data-creating controlling section configured to control a third creating section to create user interface data, including the preview data created by the second creating section, by using the parameter determined by the parameter determining section, wherein the preview-image display section is configured to display, on the display, a user interface image including the preview image based on the user interface data, including the preview data, created by the third creating section.

4. A non-transitory storage medium storing an image-forming-data transmitting program readable by a computer of a mobile terminal, the mobile terminal comprising:

a sensor configured to output sensor information indicating at least one of a movement and an orientation of the mobile terminal;

a communication portion configured to communicate with an image forming apparatus that is configured to form an image based on image forming data;

a data storage portion storing image data; and a display configured to display thereon an image on the basis of the image data, the image-forming-data transmitting program being designed to have the computer function as:

a parameter determining section configured to determine a parameter for image forming on the basis of the sensor information outputted by the sensor;

an image-forming-data-creation controlling section configured to control a first creating section to create image forming data based on the image data stored in the data storage portion, by using the parameter determined by the parameter determining section; and an image-forming-data-transmission controlling section configured to control the communication portion to transmit, to the image forming apparatus, the image forming data created by the first creating section, wherein the parameter determining section is configured to determine the parameter for the image forming such that, when the orientation of the mobile terminal which is indicated by the sensor information outputted by the sensor is a first terminal orientation, the parameter is a parameter for commanding creation of image forming data for forming a first-orientation image having a first image orientation with respect to a recording medium, and wherein the parameter determining section is configured to determine the parameter for the image forming such that, when the orientation of the mobile terminal which is indicated by the sensor information outputted by the sensor is a second terminal orientation that is different from the first terminal orientation, the parameter is a parameter for commanding creation of image forming data for forming a second-orientation image having a second image orientation with respect to the recording medium, the second image orientation being different from the first image orientation.

5. The non-transitory storage medium according to claim 4, wherein each of the recording medium and the image has a rectangular shape, wherein, when the mobile terminal is in the first terminal orientation, the parameter determining section determines a parameter for forming the first-orientation image, such that a direction in which a long side of the recording medium extends coincides with a direction in which a long side of the first-orientation image extends and such that a direction in which a short side of the recording medium extends coincides with a direction in which a short side of the first-orientation image extends, and wherein, when the mobile terminal is in the second terminal orientation, the parameter determining section determines a parameter for forming the second-orientation image, such that the direction in which the short side of the recording medium extends coincides with a direction in which the long side of the second-orientation image extends and such that the direction in which the long side of the recording medium extends coincides with a direction in which the short side of the second-orientation image extends.

6. The non-transitory storage medium according to claim 4, wherein each of the recording medium and the image has a rectangular shape, wherein, when the mobile terminal is in the first terminal orientation, the parameter determining section determines a parameter for forming the first-orientation image, such that a direction in which a long side of the recording medium extends coincides with a direction in which a short side of the first-orientation image extends and such that a direction in which a short side of the recording medium extends coincides with a direction in which a long side of the first-orientation image extends, and wherein, when the mobile terminal is in the second terminal orientation, the parameter determining section determines a parameter for forming the second-orientation image, such that the direction in which the short side of the recording medium extends coincides with a direction in which the short side of the second-orientation image extends and such that the direction in which the long side of the recording medium extends coincides with a direction in which the long side of the second-orientation image extends.

7. A non-transitory storage medium storing an image-forming-data transmitting program readable by a computer of a mobile terminal, the mobile terminal comprising:

a sensor configured to output sensor information indicating at least one of a movement and an orientation of the mobile terminal;

a communication portion configured to communicate with an image forming apparatus that is configured to form an image based on image forming data;

a data storage portion storing image data; and a display configured to display thereon an image on the basis of the image data, the image-forming-data transmitting program being designed to have the computer function as:

a parameter determining section configured to determine a parameter for image forming on the basis of the sensor information outputted by the sensor;

an image-forming-data-creation controlling section configured to control a first creating section to create image forming data based on the image data stored in the data storage portion, by using the parameter determined by the parameter determining section;

an image-forming-data-transmission controlling section configured to control the communication portion to transmit, to the image forming apparatus, the image forming data created by the first creating section;

a preview-data-creation controlling section configured to control a second creating section to create preview data based on the image data stored in the data storage portion, by using the parameter determined by the parameter determining section; and a preview-image display section configured to display, on the display, a preview image based on the preview data created by the second creating section, wherein the image-forming-data-transmission controlling section is configured to control the communication portion to execute a processing for transmitting the image forming data created by the first creating section to the image forming apparatus on condition that the preview-image display section has displayed the preview image, wherein the preview-data-creation controlling section is configured to control the second creating section to create, as the preview data, preview data that allows identification of an orientation of the image with respect to a recording medium, wherein the parameter determining section is configured to determine a parameter for creating the preview data, such that, when the orientation of the mobile terminal which is indicated by the sensor information outputted by the sensor is a first terminal orientation, the parameter is a parameter for commanding creation of preview data for a first-orientation image having a first image orientation with respect to a recording medium, and wherein the parameter determining section is configured to determine the parameter for creating the preview data, such that, when the orientation of the mobile terminal which is indicated by the sensor information outputted by the sensor is a second terminal orientation that is different from the first terminal orientation, the parameter is a parameter for commanding creation of preview data for a second-orientation image having a second image orientation with respect to the recording medium, the second image orientation being different from the first image orientation.

8. The non-transitory storage medium according to claim 7, wherein each of the recording medium and the image has a rectangular shape, wherein, when the mobile terminal is in the first terminal orientation, the parameter determining section determines a parameter for forming the first-orientation image, such that a direction in which a long side of the recording medium extends coincides with a direction in which a long side of the first-orientation image extends and such that a direction in which a short side of the recording medium extends coincides with a direction in which a short side of the first-orientation image extends, and wherein, when the mobile terminal is in the second terminal orientation, the parameter determining section determines a parameter for forming the second-orientation image, such that the direction in which the short side of the recording medium extends coincides with a direction in which the long side of the second-orientation image extends and such that the direction in which the long side of the recording medium extends coincides with a direction in which the short side of the second-orientation image extends.

9. The non-transitory storage medium according to claim 7, wherein each of the recording medium and the image has a rectangular shape, wherein, when the mobile terminal is in the first terminal orientation, the parameter determining section determines a parameter for forming the first-orientation image, such that a direction in which a long side of the recording medium extends coincides with a direction in which a short side of the first-orientation image extends and such that a direction in which a short side of the recording medium extends coincides with a direction in which a long side of the first-orientation image extends, and wherein, when the mobile terminal is in the second terminal orientation, the parameter determining section determines a parameter for forming the second-orientation image, such that the direction in which the short side of the recording medium extends coincides with a direction in which the short side of the second-orientation image extends and such that the direction in which the long side of the recording medium extends coincides with a direction in which the long side of the second-orientation image extends.

10. A non-transitory storage medium storing an image-forming-data transmitting program readable by a computer of a mobile terminal, the mobile terminal comprising:

a sensor configured to output sensor information indicating at least one of a movement and an orientation of the mobile terminal;

a communication portion configured to communicate with an image forming apparatus that is configured to form an image based on image forming data;

a data storage portion storing image data; and a display configured to display thereon an image on the basis of the image data, the image-forming-data transmitting program being designed to have the computer function as:

a parameter determining section configured to determine a parameter for image forming on the basis of the sensor information outputted by the sensor;

an image-forming-data-creation controlling section configured to control a first creating section to create image forming data based on the image data stored in the data storage portion, by using the parameter determined by the parameter determining section; and an image-forming-data-transmission controlling section configured to control the communication portion to transmit, to the image forming apparatus, the image forming data created by the first creating section, wherein, where the sensor information has detected that a first edge of a display face of the display extends in a horizontal direction, the parameter determining section is configured to determine the parameter for the image forming, such that the image based on the image forming data is drawn on a print area in such a manner that the image is accurately identified where the print area is disposed such that a first side thereof extends in the horizontal direction, and wherein, where the sensor information has detected that a second edge of the display face that intersects the first edge extends in a horizontal direction, the parameter determining section is configured to determine the parameter for the image forming, such that the image based on the image forming data is drawn on the print area in such a manner that the image is accurately identified where the print area is disposed such that a second side thereof that intersects the first side extends in the horizontal direction.

* * * * *